(12) United States Patent
Ubhi et al.

(10) Patent No.: US 9,881,022 B2
(45) Date of Patent: Jan. 30, 2018

(54) SELECTION OF NETWORKS FOR COMMUNICATING WITH UNMANNED AERIAL VEHICLES

(71) Applicant: Verizon Patent and Licensing Inc., Arlington, VA (US)

(72) Inventors: Gurpreet Ubhi, Nutley, NJ (US); Ashok N. Srivastava, Mountain View, CA (US); Douglas M. Pasko, Bridgewater, NJ (US); Hani Batla, Teaneck, NJ (US); Igor Kantor, Raleigh, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 585 days.

(21) Appl. No.: 14/282,378

(22) Filed: May 20, 2014

(65) Prior Publication Data
US 2016/0300493 A1  Oct. 13, 2016

(51) Int. Cl.
*G06F 17/30* (2006.01)
*G08G 5/00* (2006.01)
(Continued)

(52) U.S. Cl.
CPC ...... *G06F 17/30241* (2013.01); *B64C 39/024* (2013.01); *G06Q 10/083* (2013.01); *G08G 5/006* (2013.01); *G08G 5/0013* (2013.01); *G08G 5/0026* (2013.01); *G08G 5/0034* (2013.01); *G08G 5/0039* (2013.01);
(Continued)

(58) Field of Classification Search
None
See application file for complete search history.

(56) References Cited

U.S. PATENT DOCUMENTS 6,400,690 B1 * 6/2002 Liu .................. H04W 24/00
340/995.26
8,606,266 B1 * 12/2013 Mitchell ............ H04L 69/321
455/427

(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.

(Continued)

*Primary Examiner* — Rami Khatib
*Assistant Examiner* — Jeffrey Boomer

(57) ABSTRACT

A device receives a request for a flight path, for a UAV, from a first location to a second location, and calculates the flight path based on the request for the flight path. The device determines network requirements for the flight path based on the request, and determines scores for multiple networks with coverage areas covering a portion of the flight path. The device selects a particular network, from the multiple networks, based on the network requirements for the flight path and based on the scores for the multiple networks. The device causes a connection with the UAV and the particular network to be established, and generates flight path instructions for the flight path. The device provides, via the connection with the particular network, the flight path instructions to the UAV to permit the UAV to travel from the first location to the second location via the flight path.

20 Claims, 11 Drawing Sheets

(51) Int. Cl.

| | | |
|---|---|---|
| *H04B 7/185* | (2006.01) | |
| *B64C 39/02* | (2006.01) | |
| *H04W 36/14* | (2009.01) | |
| *H04B 17/318* | (2015.01) | |
| *G06Q 10/08* | (2012.01) | |

(52) U.S. Cl.
CPC ......... *G08G 5/0043* (2013.01); *G08G 5/0056* (2013.01); *G08G 5/0069* (2013.01); *G08G 5/0082* (2013.01); *G08G 5/0086* (2013.01); *G08G 5/0091* (2013.01); *H04B 7/18504* (2013.01); *H04B 17/318* (2015.01); *B64C 2201/128* (2013.01); *H04W 36/14* (2013.01)

(56) References Cited

U.S. PATENT DOCUMENTS

| | | | | |
|---|---|---|---|---|
| 8,626,361 | B2* | 1/2014 | Gerlock | G08G 5/0013 340/991 |
| 8,818,719 | B1* | 8/2014 | Thanayankizil | G07C 5/008 340/988 |
| 2002/0029108 | A1* | 3/2002 | Liu | G01C 21/26 701/410 |
| 2010/0070124 | A1* | 3/2010 | Yeager | G05D 1/0022 701/25 |
| 2012/0065881 | A1* | 3/2012 | McIver | G01C 23/00 701/467 |
| 2013/0218469 | A1* | 8/2013 | Turton | G08G 1/096811 701/533 |
| 2013/0238807 | A1* | 9/2013 | Wakikawa | H04W 48/18 709/227 |
| 2014/0032034 | A1* | 1/2014 | Raptopoulos | G08G 5/0069 701/25 |
| 2014/0142785 | A1* | 5/2014 | Fuentes | G05D 1/0011 701/2 |
| 2014/0142787 | A1* | 5/2014 | Tillotson | G05D 1/101 701/3 |
| 2014/0254543 | A1* | 9/2014 | Engelhard | H04W 64/006 370/329 |
| 2014/0342716 | A1* | 11/2014 | Harris | H04W 8/22 455/418 |
| 2015/0063202 | A1* | 3/2015 | Mazzarella | H04B 7/18504 370/316 |
| 2015/0323930 | A1* | 11/2015 | Downey | G08G 5/006 701/2 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.
Park et al., "Agent Technology for Coordinating UAV Target Tracking", Knowledge-Based Intelligent Information and Engineering Systems, Springer Berlin Heidelberg, 2005, 8 pages.
Kuwata et al., "Three Dimensional Receding Horizon Control for UAVs", AIAA Guidance, Navigation, and Control Conference and Exhibit, Aug. 16-19, 2004, 14 pages.
Alighanbari et al., "Filter-Embedded UAV Task Assignment Algorithms for Dynamic Environments", AIAA Guidance, Navigation, and Control Conference and Exhibit, Aug. 16-19, 2004, 15 pages.
Saad et al., "Vehicle Swarm Rapid Prototyping Testbed", American Institute of Aeronautics and Astronautics, Aerospace Conference and AIAA Unmanned . . . Unlimited Conference, 2009, 9 pages.
Richards et al., "Decentralized Model Predictive Control of Cooperating UAVs", 43rd IEEE Conference on Decision and Control, vol. 4, IEEE, 2004, 6 pages.
Bertuccelli et al., "Robust Planning for Coupled Cooperative UAV Missions", 43rd IEEE Conference on Decision and Control, vol. 3, IEEE, 2004, 8 pages.
Toksoz et al., "Automated Battery Swap and Recharge to Enable Persistent UAV Missions", AIAA Infotech@ Aerospace Conference, 2011, 10 pages.
How et al., "Multi-vehicle Experimental Platform for Distributed Coordination and Control", http://web.mit.edu/people/jhow/durip1.html, Apr. 1, 2004, 4 pages.
Chung Tin, "Robust Multi-UAV Planning in Dynamic and Uncertain Environments", Massachusetts Institute of Technology, 2004, 110 pages.
How et al., "Flight Demonstrations of Cooperative Control for UAV Teams", AIAA 3rd "Unmanned Unlimited" Technical Conference, Workshop and Exhibit, Sep. 20-23, 2004, 9 pages.
Wikipedia, "Waze", http://en.wikipedia.org/wiki/Waze, Mar. 30, 2014, 6 pages.
Choi et al., "Information deliver scheme of micro UAVs having limited communication range during tracking the moving target" The Journal of Supercomputing, vol. 66, Issue 2, 2013, pp. 950-972.
Boyd et al., "Convex Optimization", Cambridge University Press, 2004, 730 pages.

* cited by examiner

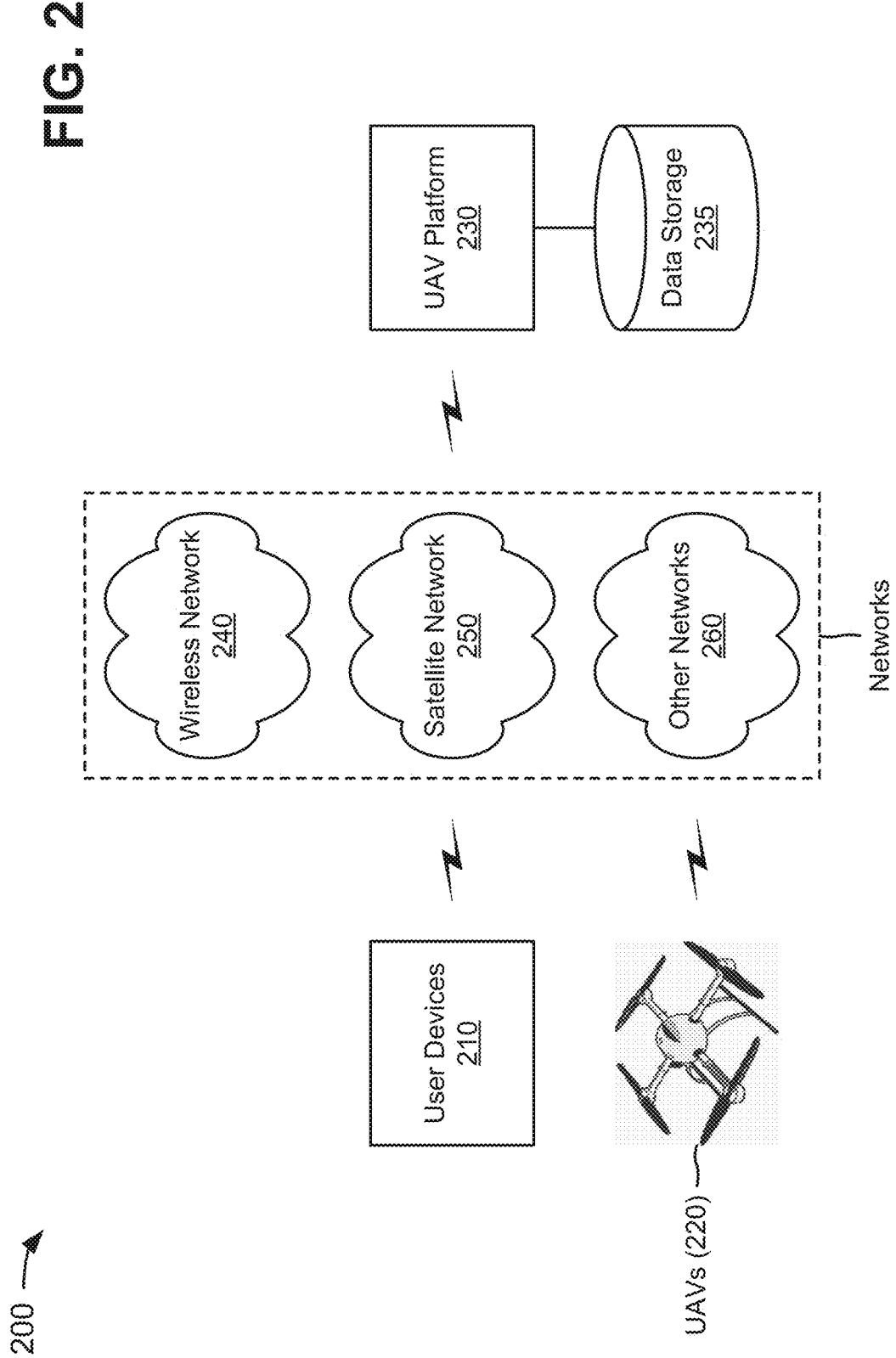

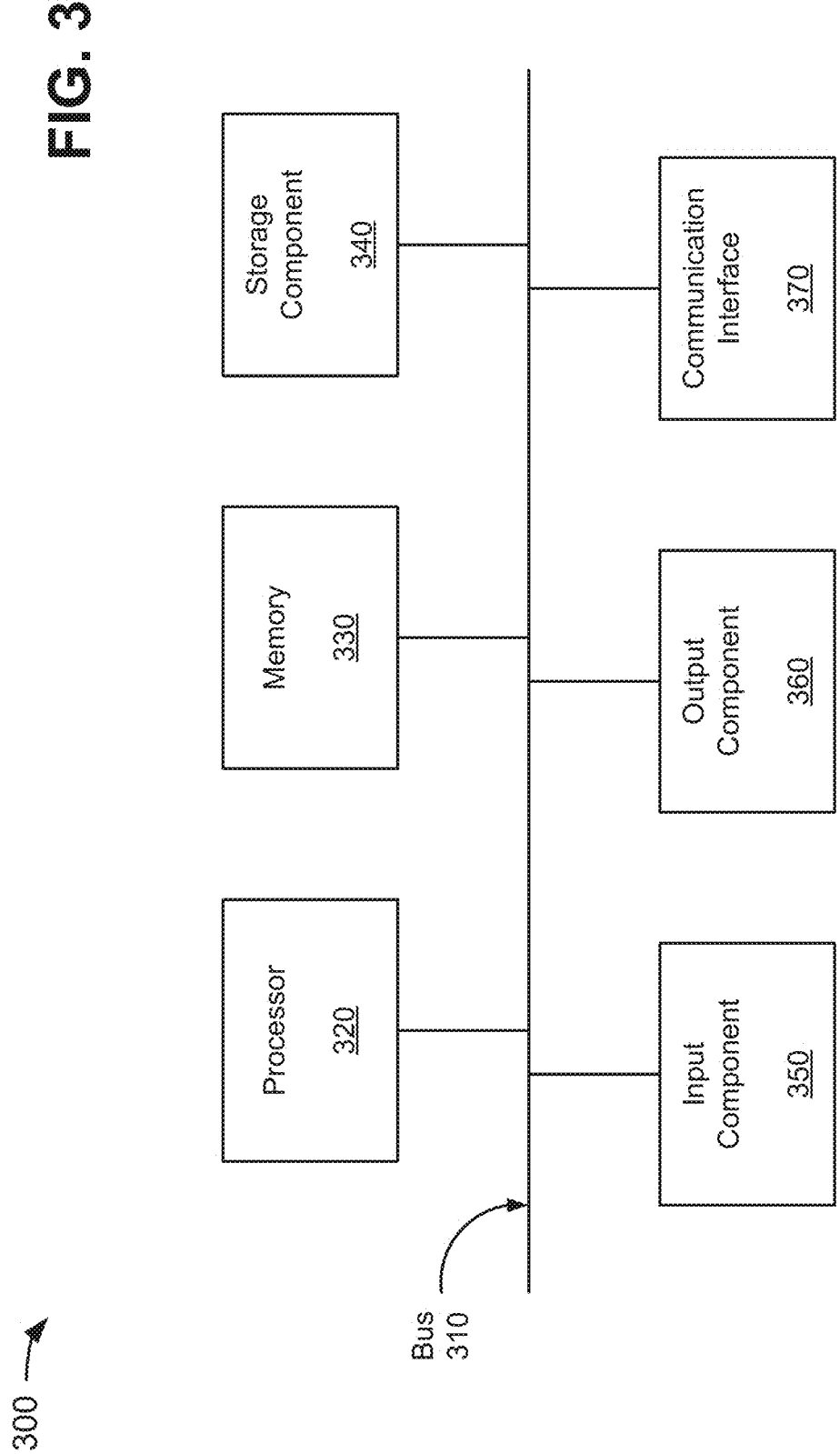

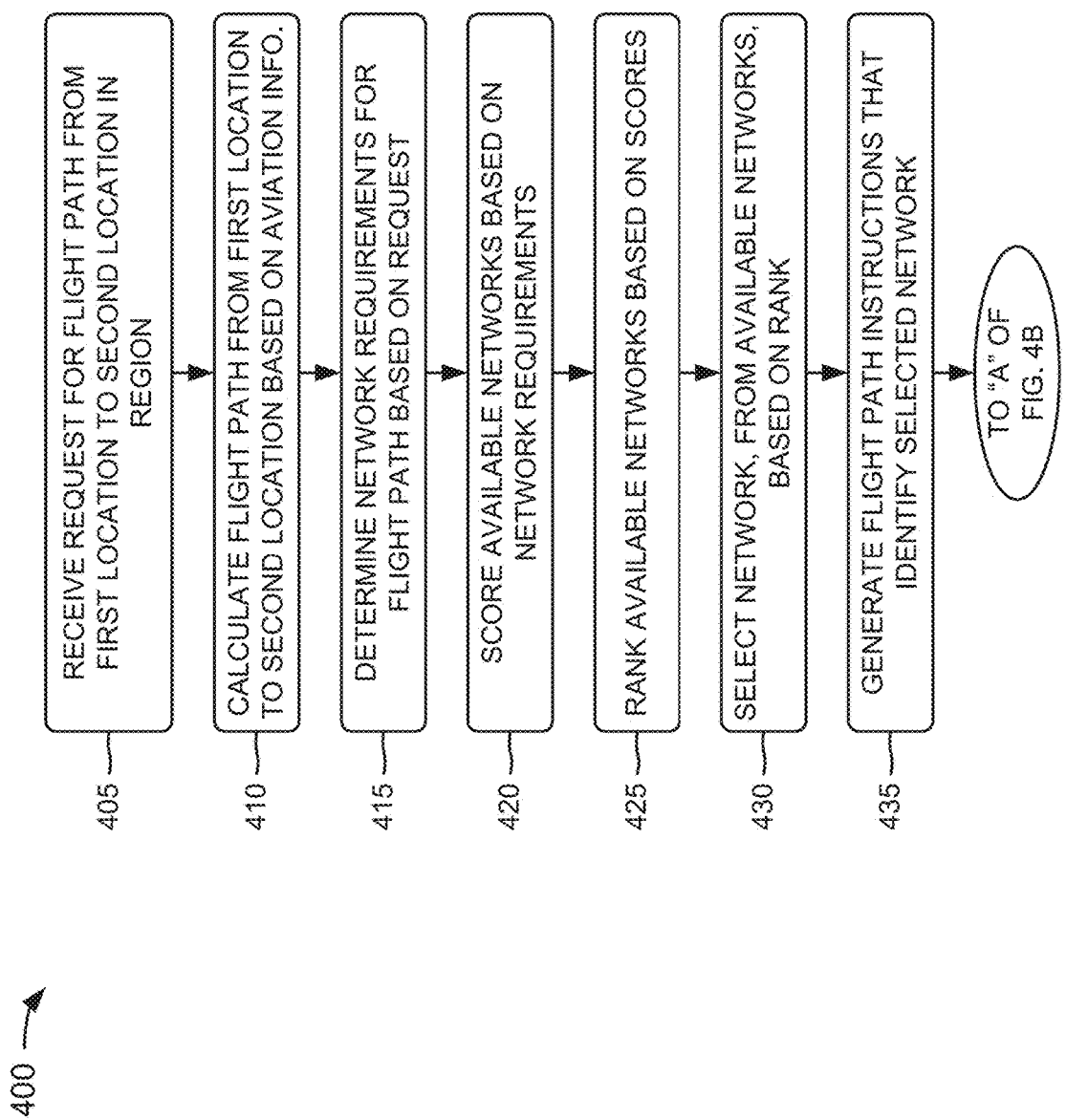

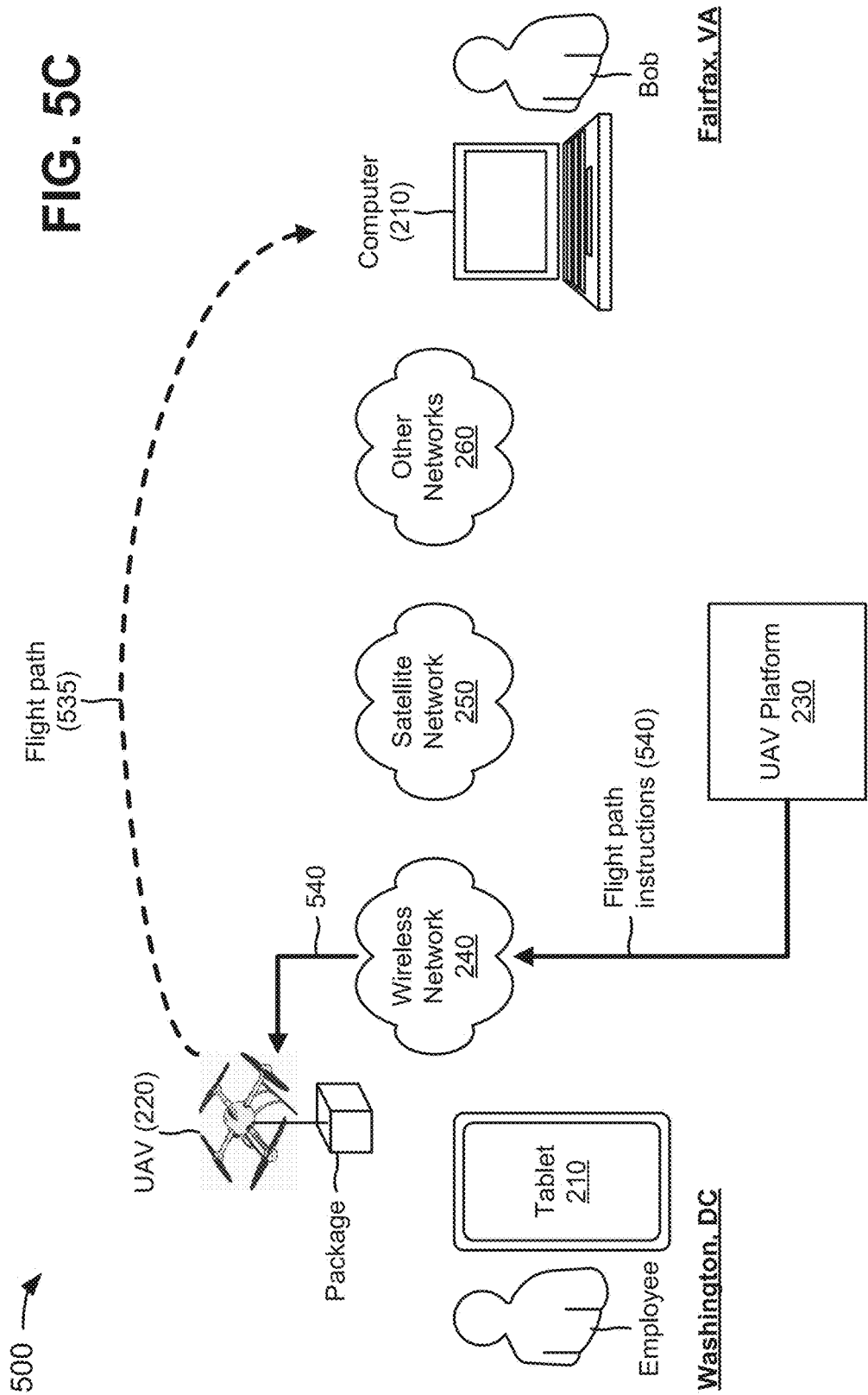

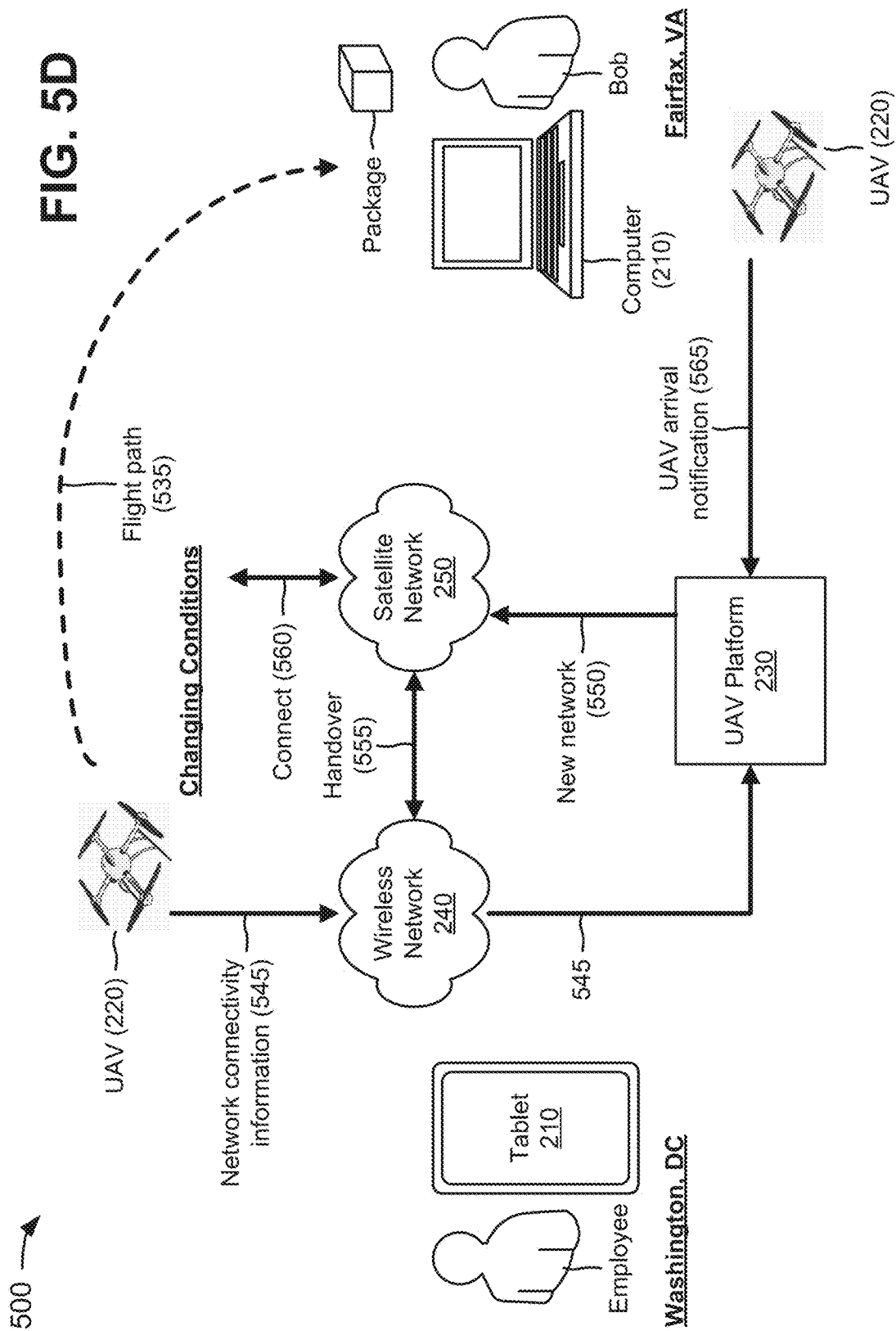

SELECTION OF NETWORKS FOR COMMUNICATING WITH UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for selecting a network for communicating with a UAV during traversal of a flight path; and FIGS. 5A-5E are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
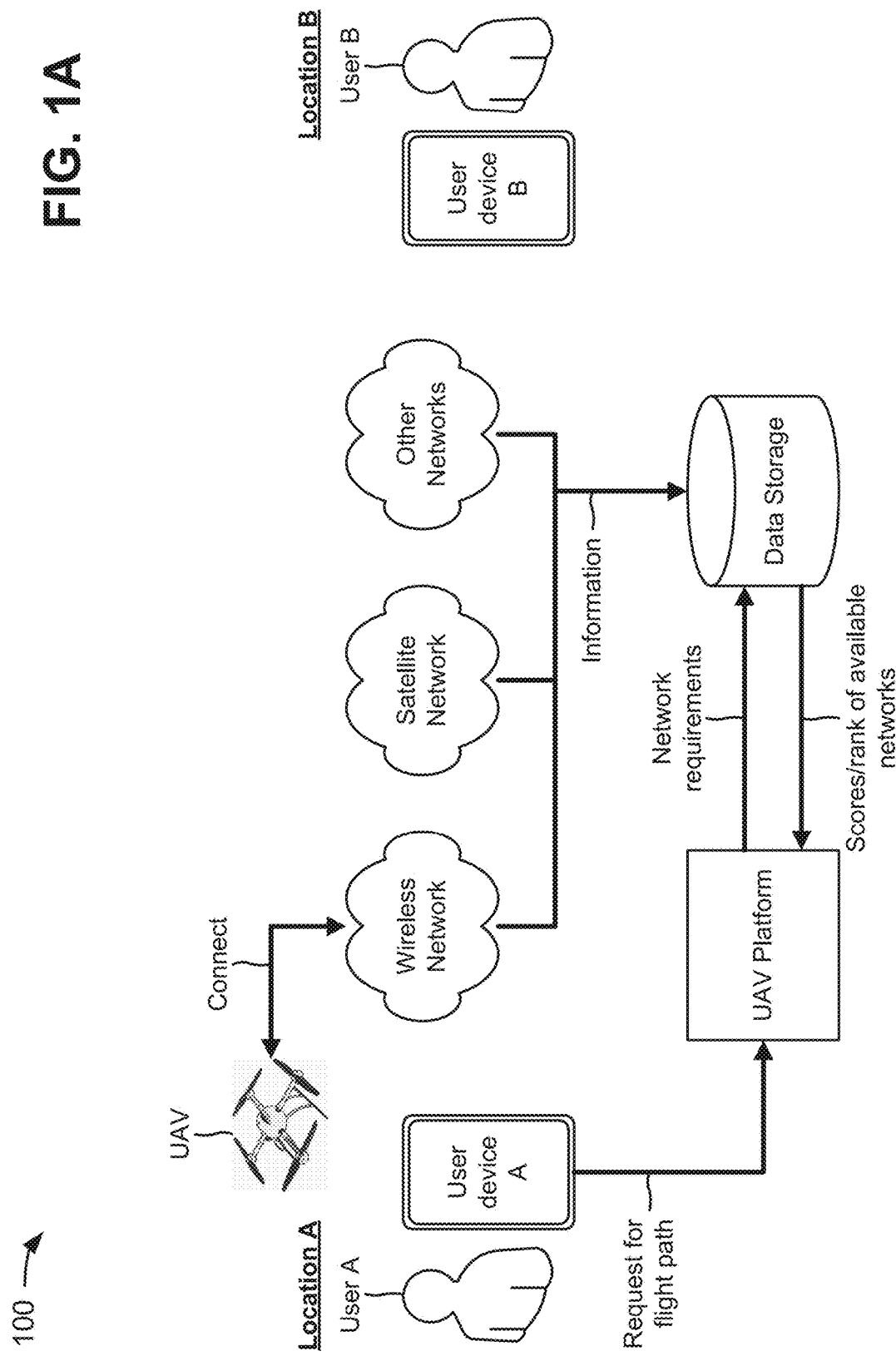
FIGS. 1A and 1B are diagrams of an overview of an example implementation described herein.
Figure 1B:
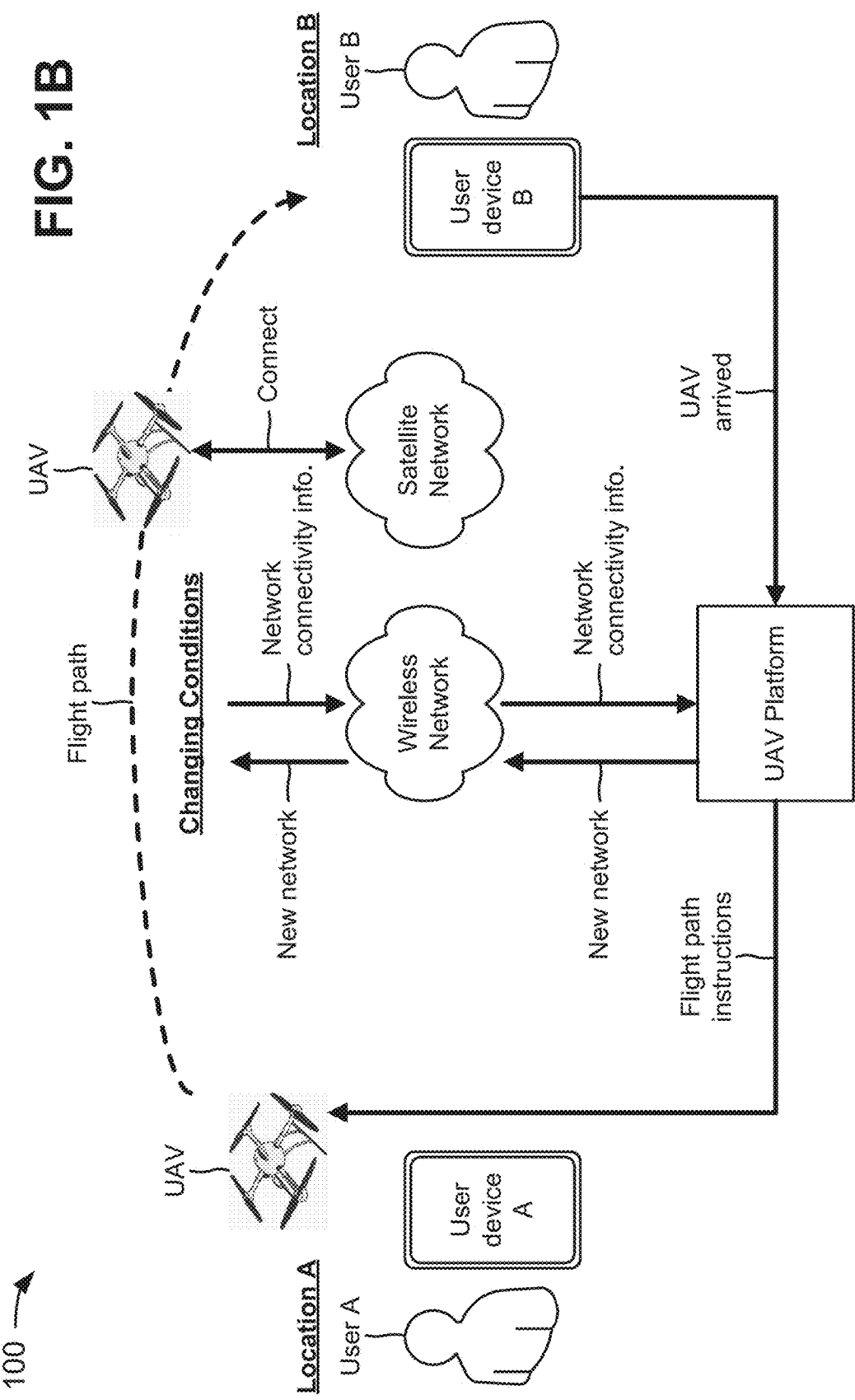

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with the UAV (e.g., a thrust, a battery life, etc. associated with the UAV); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc.

As further shown in FIG. 1A, user A may instruct user device A to generate a request for a flight path (e.g., from location A to location B) for the UAV, and to provide the request to the UAV platform. The request may include credentials (e.g., serial numbers, identifiers of universal integrated circuit cards (UICCs), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. In example implementation 100, assume that the UAV is authenticated by the UAV platform.

The UAV platform may calculate a flight path from location A to location B based on aviation information (e.g., the weather information, the air traffic information, etc.) associated with the geographical region. The UAV platform may track the flight path of the UAV based on the UAV's continuous connectivity to a network (e.g., the wireless network, the satellite network, etc.), but may lose connectivity with the UAV when the UAV travels outside a range of the network. As further shown in FIG. 1A, the UAV platform may determine network requirements for the flight path based on the request for the flight path. For example, the UAV platform may determine that the UAV is to connect to a cheapest network, a network with the greatest security, a network with the most bandwidth, etc. during traversal of the flight path. The UAV platform may assign different weights to different available networks (e.g., the wireless network, the satellite network, etc.), and may calculate a score for each of the available networks based on the network requirements and the assigned weights. The UAV platform may rank the available networks based on the scores (e.g., in ascending order, descending order, etc.), and may store the scores and the rankings for the available networks in the data storage. The UAV platform may retrieve the scores and the rankings for the available networks from the data storage, as further shown in FIG. 1A.

The UAV platform may select a particular network based on the scores and the rankings for the available networks. For example, the UAV platform may select the wireless network as the network to which the UAV is to connect based on the scores and the rankings for the available networks since the wireless network may be less expensive to utilize than the satellite network and the other networks. As further shown in FIG. 1A, the UAV may connect to the wireless network based on the selection of the wireless network (e.g., as the particular network).

After selecting the wireless network, the UAV platform may generate flight path instructions for the flight path, as shown in FIG. 1B. For example, the flight path instructions may indicate that the UAV is to fly at an altitude of two-thousand (2,000) meters, for fifty (50) kilometers and fifty-five (55) minutes, in order to arrive at location B. The UAV platform may provide the flight path instructions to the UAV (e.g., via the wireless network), as further shown in FIG. 1B.

The UAV may take off from location A, and may travel the flight path based on the flight path instructions. While the UAV is traversing the flight path, the wireless network may receive and/or generate network connectivity information associated with the UAV (e.g., about changing conditions, such as the UAV flying out of range of the wireless network, etc.). The wireless network may provide the network connectivity information to the UAV platform, and the UAV platform may select a new network, to which the UAV is to connect, based on the network connectivity information. For example, the UAV platform may select the satellite network as the new network, and may instruct the UAV to connect to the satellite network based on the selection. As further shown in FIG. 1B, the UAV may connect to the satellite network, and may continue to traverse the flight path (e.g., while connected to the satellite network) until the UAV arrives at location B. When the UAV arrives at location B, the UAV and/or user device B may generate a notification indicating that the UAV arrived safely at location B, and may provide the notification to the UAV platform.

Systems and/or methods described herein may provide a platform that enables UAVs to safely traverse flight paths from origination locations to destination locations. The systems and/or methods may enable UAVs to seamlessly connect with the platform via various networks, which may ensure that the platform continuously communicates with the UAVs. The systems and/or methods may enable the platform to select a network for communicating with the UAV, and the selected network may reduce connectivity costs, increase security of communications, reduce the need for handoffs to other networks, offer the best connectivity, or the like.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive, from user device 210, a request for a flight path from an origination location to a destination location. UAV platform 230 may calculate the flight path from the origination location to the destination location based on aviation information (e.g., weather information, air traffic information, etc.), and may determine network requirements for the flight path based on the request for the flight path. UAV platform 230 may assign different weights to different networks (e.g., wireless network 240, satellite network 250, etc.) available to UAV 220, and may calculate a score for each network based on the network requirements and/or the assigned weights. UAV platform 230 may rank the available networks based on the scores (e.g., in ascending order, descending order, etc.), and may select a particular network, from the available networks, based on the ranks and/or based on the network requirements for the flight path. After selecting the network, UAV platform 230 may generate flight path instructions that identify the selected network, and may provide the flight path instructions to UAV 220. UAV 220 may connect to the selected network, based on the flight path instructions, so that UAV 220 may communicate with UAV platform 230. UAV platform 230 may receive network connectivity information from UAV 220 during traversal of the flight path by UAV 220. UAV platform 230 may select a new network based on the network connectivity information, and may provide information associated with the new network to UAV 220 (e.g., so that UAV 220 may connect with the new network). UAV platform 230 may receive a notification that UAV 220 arrived at the destination location when UAV 220 lands at the destination location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no-fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
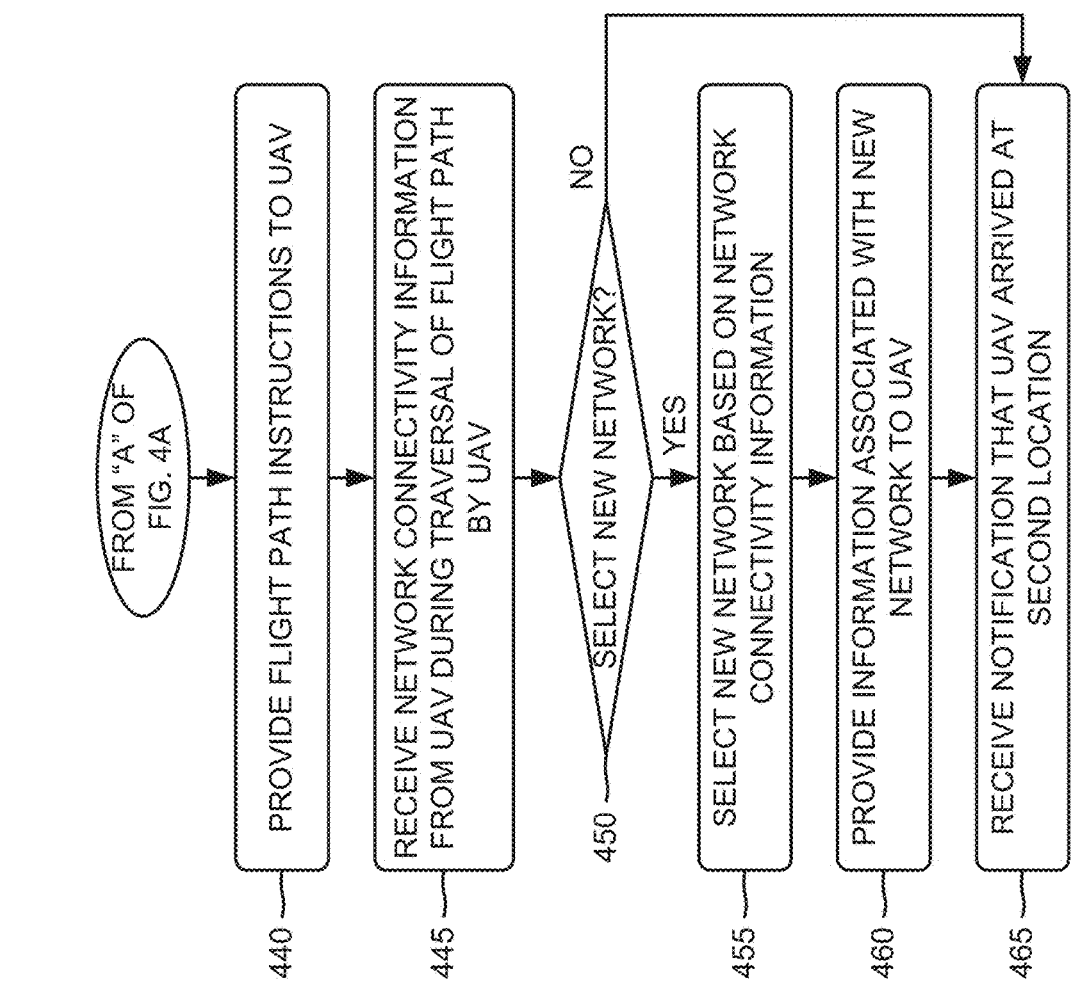

FIGS. 4A and 4B depict a flow chart of an example process 400 for selecting a network for communicating with a UAV during traversal of a flight path. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for a flight path from a first location to a second location in a region (block 405). For example, UAV platform 230 may receive, from user device 210, a request for a flight path from a first location to a second location in a particular region. In some implementations, the request for the flight path may include a request for flight path instructions from an origination location (e.g., a current location of UAV 220) to a destination location (e.g., a location in the particular region). The origination location and the destination location may be provided in the particular region. In some implementations, UAV 220 may be associated with UAV platform 230 and/or user(s) associated with user device 210. For example, user device 210 and UAV 220 may be owned and/or operated by a delivery company, a telecommunication service provider, a television service provider, an Internet service provider, etc.

As further shown in FIG. 4A, process 400 may include calculating the flight path from the first location to the second location based on aviation information (block 410). For example, UAV platform 230 may calculate the flight path from the origination location to the destination location based on aviation information. In some implementations, UAV platform 230 may calculate the flight path from the origination location to the destination location based on aviation information associated with the particular region, such as the weather information, the air traffic information, the obstacle information, the regulatory information, the historical information, etc. stored in UAV platform 230 and/or data storage 235. In some implementations, UAV platform 230 may determine whether the aviation information indicates that UAV 220 may safely complete the flight path from the origination location to the destination location without stopping. If UAV platform 230 determines that UAV 220 cannot safely complete the flight path from the origination location to the destination location without stopping (e.g., to recharge or refuel), UAV platform 230 may determine one or more waypoints along the flight path for stopping and recharging or refueling.

In some implementations, UAV platform 230 may calculate the flight path based on the weather information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the air traffic information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with the other UAVs 220. Alternatively, UAV platform 230 may not alter the flight path, but the other UAVs 220 flying at the altitude of five-hundred meters may increase the possibility that UAV 220 may collide with another UAV 220. UAV platform 230 may then determine whether UAV 220 is capable of safely flying at the altitude of five-hundred meters without colliding with another UAV 220.

Additionally, or alternatively, UAV platform 230 may calculate the flight path based on the obstacle information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the regulatory information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the historical information. For example, UAV platform 230 may identify prior flight paths from the origination location to the destination location from the historical information, and may select one of the prior flight paths, as the flight path. For example, assume that UAV platform 230 identifies three prior flight paths that include flight times of two hours, three hours, and four hours, respectively. In such an example, UAV platform 230 may select, as the flight path, the prior flight path with the flight time of two hours.

As further shown in FIG. 4A, process 400 may include determining network requirements for the flight path based on the request for the flight path (block 415). For example, UAV platform 230 may determine network requirements for the flight path based on the request for the flight path. In some implementations, UAV platform 230 may determine the network requirements based on the origination location, the destination location, and/or the particular region associated with the flight path. For example, UAV platform 230 may determine that the flight path requires one or more of networks 240-260 at or near the origination location, the destination location, the particular region, etc. so that UAV 220 may communicate with UAV platform 230. In such an example, UAV platform 230 may determine that UAV 220 may communicate with UAV platform 230, via wireless network 240, during traversal of the flight path by UAV 220. In another example, UAV platform 230 may determine that UAV 220 may communicate with UAV platform 230 via wireless network 240 during a portion of the flight path, may communicate with UAV platform 230 via satellite network 250 during another portion of the flight path, etc.

In some implementations, UAV platform 230 may determine that the flight path requires utilization of a most reliable network or networks for communication with UAV 220. For example, UAV platform 230 may determine that the flight path requires wireless network 240 (e.g., a cellular network), if wireless network 240 is available, since wireless network 240 may be more reliable than satellite network 250 and/or other networks 260. If wireless network 240 is not available, UAV platform 230 may determine that the flight path requires satellite network 250 (e.g., a GPS network), if satellite network 250 is available, since satellite network 250 may be more reliable than other networks 260. If wireless network 240 and satellite network 250 are not available, UAV platform 230 may determine that the flight path requires other networks 260, such as a Wi-Fi network, a cellular network generated by a dedicated UAV 220 (e.g., a stationary UAV 220, with a constant power source, that provides cellular coverage), a wireless network hotspot (e.g., a mobile hotspot), etc.

In some implementations, if none of networks 240-260 are available, UAV platform 230 may determine that UAV 220 is to traverse flight path (e.g., without communicating with UAV platform 230) until UAV 220 enters an area covered by one of networks 240-260. In some implementations, if multiple wireless networks 240, satellite networks 250, and/or other networks 260 are available, UAV platform 230 may determine that the flight path requires a most reliable of wireless networks 240, satellite networks 250, and/or other networks 260.

In some implementations, UAV platform 230 may determine that the flight path requires utilization of a least expensive network or networks for communication with UAV 220. For example, UAV platform 230 may determine that the flight path requires other networks 260 (e.g., a Wi-Fi network), if other networks 260 are available, since other networks 260 may be less expensive to utilize than wireless network 240 and/or satellite network 250. If other networks 260 are not available, UAV platform 230 may determine that the flight path requires satellite network 250 (e.g., a GPS network), if satellite network 250 is available, since satellite network 250 may be less expensive to utilize than wireless network 240. If satellite network 250 and other networks 260 are not available, UAV platform 230 may determine that the flight path requires wireless network 240, such as a cellular network. In some implementations, if multiple wireless networks 240, satellite networks 250, and/or other networks 260 are available, UAV platform 230 may determine that the flight path requires a least expensive of wireless networks 240, satellite networks 250, and/or other networks 260.

In some implementations, UAV platform 230 may determine that the flight path requires utilization of a most secure network or networks for communication with UAV 220. For example, UAV platform 230 may determine that the flight path requires wireless network 240 (e.g., a cellular network), if wireless network 240 is available, since wireless network 240 may be more secure than satellite network 250 and/or other networks 260. If wireless network 240 is not available, UAV platform 230 may determine that the flight path requires satellite network 250 (e.g., a GPS network), if satellite network 250 is available, since satellite network 250 may be more secure than other networks 260. If wireless network 240 and satellite network 250 are not available, UAV platform 230 may determine that the flight path requires other networks 260 (e.g., a Wi-Fi network, a cellular network generated by a dedicated UAV 220, a mobile hotspot, etc.). In some implementations, if multiple wireless networks 240, satellite networks 250, and/or other networks 260 are available, UAV platform 230 may determine that the flight path requires a most secure of wireless networks 240, satellite networks 250, and/or other networks 260.

In some implementations, UAV platform 230 may determine that the flight path requires utilization of a network or networks with a greatest bandwidth. For example, UAV platform 230 may determine that the flight path requires wireless network 240 (e.g., a cellular network), if wireless network 240 is available, since wireless network 240 may have a greater bandwidth than satellite network 250 and/or other networks 260. If wireless network 240 is not available, UAV platform 230 may determine that the flight path requires satellite network 250 (e.g., a GPS network), if satellite network 250 is available, since satellite network 250 may have a greater bandwidth than other networks 260. If wireless network 240 and satellite network 250 are not available, UAV platform 230 may determine that the flight path requires other networks 260 (e.g., a Wi-Fi network, a cellular network generated by a dedicated UAV 220, a mobile hotspot, etc.). In some implementations, if multiple wireless networks 240, satellite networks 250, and/or other networks 260 are available, UAV platform 230 may determine that the flight path requires one of wireless networks 240, satellite networks 250, and/or other networks 260 with a greatest bandwidth.

In some implementations, UAV platform 230 may determine the network requirements based on components (e.g., sensors, network generating components, etc. of UAV 220) associated with UAV 220. For example, UAV platform 230 may determine that UAV 220 is capable of communicating with wireless network 240 but not with satellite network 250 and/or other networks 260 (e.g., since UAV 220 only includes a component to communicate with wireless network 240). In such an example, UAV platform 230 may determine that satellite network 250 and/or other networks 260 do not satisfy the network requirements, but that wireless network 240 satisfies the network requirements. In another example, UAV platform 230 may determine that UAV 220 includes a GPS component that can communicate with satellite network 250. In such an example, UAV platform 230 may determine that wireless network 240 and/or other networks 260 do not satisfy the network requirements, but that satellite network 250 satisfies the network requirements.

In some implementations, UAV platform 230 may determine the network requirements based on the aviation information associated with the particular region, such as the weather information, the air traffic information, the obstacle information, the regulatory information, the historical information, etc. associated with the particular region. For example, assume that the obstacle information indicates that the flight path requires UAV 220 to travel at an altitude of one kilometer. In such an example, UAV platform 230 may determine that the flight path requires a network (e.g., satellite network 250) that is capable of providing coverage at the one kilometer altitude. In another example, assume that the weather information indicates that the flight path requires UAV 220 to travel at an altitude of one-hundred meters to avoid strong headwinds. In such an example, UAV platform 230 may determine that the flight path requires a network (e.g., a Wi-Fi network) that is capable of providing coverage at the one-hundred meter altitude.

As further shown in FIG. 4A, process 400 may include scoring available networks based on the network requirements (block 420). For example, UAV platform 230 may retrieve, from data storage 235, information associated with wireless network 240, satellite network 250, other networks 260, etc. In some implementations, data storage 235 may include information associated with networks 240-260, such as availability information, security information, cost information, bandwidth information, network resources information, etc. associated with networks 240-260. In some implementations, UAV platform 230 may assign different weights to different information associated with networks 240-260. In some implementations, UAV platform 230 may calculate a score for each of networks 240-260 based on the information associated with networks 240-260 and/or based on the assigned weights. For example, assume that UAV platform 230 assigns a weight of 0.1 to costs associated with networks 240-260, a weight of 0.2 to security associated with networks 240-260, and a weight of 0.5 to bandwidths associated with networks 240-260. Further, assume that UAV platform 230 calculates a score of 0.4 for other networks 260, a score of 0.7 for wireless network 240, and a score of 0.5 for satellite network 250 based on the assigned weights.

In some implementations, UAV platform 230 may select one or more networks to utilize for the flight path, and may identify a greatest or lowest score for the selected network(s) utilized during the flight path (e.g., an end-to-end flight path score). Each of the selected network(s) may include certain coverage area(s) which may (or may not) cover part of or all the flight path. In some implementations, UAV platform 230 may select a network or a combination of networks to cover as much of the flight path as possible, with a greatest (or lowest) score(s) for the selected network(s). In some implementations, the score(s) of the selected network(s) may be relative to different parts of the flight path. For example, wireless network 240 might be the best network for one part of the flight path, but may be the worst network for another part of the flight path (e.g., even though wireless network 240 has coverage in both parts of the flight path). In some implementations, UAV platform 230 may select an initial network to utilize for the flight path, and may select one or more additional networks, to utilize for communications with UAV 220, as UAV 220 traverses the flight path.

As further shown in FIG. 4A, process 400 may include ranking the available networks, based on the scores (block 425). For example, UAV platform 230 may rank each of networks 240-260 based on a score calculated for each of networks 240-260. In some implementations, UAV platform 230 may rank networks 240-260 based on the scores in ascending order, descending order, etc. For example, assume that UAV platform 230 calculates a score of 0.4 for other networks 260, a score of 0.7 for wireless network 240, and a score of 0.5 for satellite network 250. In such an example, UAV platform 230 may rank networks 240-260 based on the scores, for example, as: (1) wireless network 240, (2) satellite network 250, and (3) other networks 260.

As further shown in FIG. 4A, process 400 may include selecting a particular network, from the available networks, based on the rank (block 430). For example, UAV platform 230 may select a particular network, from networks 240-260, based on the rank associated with networks 240-260. In some implementations, UAV platform 230 may select, as the particular network, a network with a greatest ranking. For example, assume that UAV platform 230 calculates a score of 0.4 for other networks 260, a score of 0.7 for wireless network 240, and a score of 0.5 for satellite network 250. In such an example, UAV platform 230 may rank networks 240-260 based on the scores (e.g., as (1) wireless network 240, (2) satellite network 250, and (3) other networks 260), and may select wireless network 240 as the particular network (e.g., via which to communicate with UAV 220) based on the ranking, since wireless network 240 has the greatest score.

In some implementations, UAV platform 230 may not utilize the ranking of networks 240-260, and may select the particular network, from networks 240-260, based on the scores associated with networks 240-260. For example, assume that UAV platform 230 calculates a score of 0.4 for other networks 260, a score of 0.7 for wireless network 240, and a score of 0.5 for satellite network 250. In such an example, UAV platform 230 may select other networks 260 as the particular network (e.g., via which to communicate with UAV 220) since other networks 260 has the lowest score.

As further shown in FIG. 4A, process 400 may include generating flight path instructions that identify the selected network (block 435). For example, UAV platform 230 may generate flight path instructions that identify the selected network (e.g., wireless network 240). In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240 via which UAV 220 may communicate with UAV platform 230); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers and at an altitude of five-hundred meters, then fly three-hundred and fifteen degrees northwest for ten kilometers and at an altitude of four-hundred meters, etc.

In some implementations, the flight path instructions may include information instructing UAV 220 to connect to network X until UAV 220 reaches point A of the flight path, then connect to network Y until UAV 220 reaches point B of the flight path, and then connect back to network X for the remainder of the flight path. In some implementations, the flight path instructions may include information instructing UAV 220 to connect to network X until UAV 220 loses connectivity, and then connect to network Y for the remainder of the flight path. In some implementations, the flight path instructions may include information instructing UAV 220 to connect to network X until UAV 220 reaches point A of the flight path, and then keep trying to connect to network Y until successful.

As shown in FIG. 4B, process 400 may include providing the flight path instructions to the UAV (block 440). For example, UAV platform 230 may provide the flight path instructions to UAV 220. In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4B, process 400 may include receiving network connectivity information from the UAV during traversal of the flight path by the UAV (block 445). For example, while UAV 220 is traveling along the flight path in accordance with the flight path instructions, UAV 220 and/or the selected network (e.g., one or more of networks 240-260) may provide network connectivity information to UAV platform 230, and UAV platform 230 may receive the network connectivity information. In some implementations, the network connectivity information may include information associated with a connection between UAV 220 and the selected network. For example, the network connectivity information may include information associated with signal strength between UAV 220 and the selected network, a bandwidth provided by the selected network to UAV 220, etc.

As further shown in FIG. 4B, process 400 may include determining whether to select a new network based on the network connectivity information (block 450). For example, UAV platform 230 may determine whether to select a new network for communicating with UAV 220 based on the network connectivity information. In some implementations, UAV platform 230 may determine to not select a new network if the network connectivity information indicates that UAV 220 will continue to communicate with UAV platform 230 via the selected network. In some implementations, UAV platform 230 may determine to select a new network if the network connectivity information indicates that UAV 220 is losing or will lose a signal received from the selected network (e.g., UAV 220 will not be able to communicate with UAV platform 230). In such implementations, UAV platform 230 may select a new network so that UAV 220 may continue to communicate with UAV platform 230 via the new network. For example, assume that UAV 220 is communicating with UAV platform 230 via wireless network 240, but is about to fly out of a range of wireless network 240. Further, assume that UAV 220 is flying in a range of satellite network 250. In such an example, UAV platform 230 may instruct UAV 220 to disconnect from wireless network 240 and to connect with satellite network 250 so that UAV 220 may communicate with UAV platform 230 via satellite network 250.

As further shown in FIG. 4B, if the new network is to be selected (block 450—YES), process 400 may include selecting the new network based on the network connectivity information (block 455). For example, if UAV platform 230 determines that a new network is to be selected, UAV platform 230 may select a new network based on the network connectivity information (e.g., as described above). In some implementations, if the selected network is wireless network 240, the new network may include another wireless network 240, satellite network 250, and/or one or more of other networks 260. In some implementations, the new network may enable UAV 220 to communicate with UAV platform 230. In some implementations, UAV platform 230 may generate modified flight path instructions, which include information associated with the new network, based on the network connectivity information. In some implementations, the modified flight path instructions may include the features of flight path instructions, but may be modified based on the network connectivity information. For example, the flight path instructions may be modified to instruct UAV 220 to disconnect from wireless network 240 and connect with satellite network 250.

As further shown in FIG. 4B, process 400 may include providing information associated with the new network to the UAV (block 460). For example, UAV platform 230 may provide, to UAV 220, information associated with the new network, such as a system identification code (SID), security information, bandwidth information, etc. associated with the new network. In some implementations, UAV platform 230 may provide the information associated with the new network via the modified flight path instructions. In some implementations, UAV 220 may utilize the information associated with the new network to connect with the new network and to communicate with UAV platform 230. For example, UAV 220 may instruct the selected network to handover communication to the new network (e.g., so that UAV 220 may continuously communicate with UAV platform 230) until UAV 220 arrives at the destination location. In some implementations, UAV 220 may continue to provide further network connectivity information to UAV platform 230 during traversal of the flight path, and UAV platform 230 may or may not select another new network based on the further network connectivity information.

As further shown in FIG. 4B, if the new network is not selected (block 450—NO), process 400 may include receiving a notification that the UAV arrived at the second location (block 465). For example, if the network connectivity information indicates that UAV 220 may still communicate with UAV platform 230 via the selected network, UAV platform 230 may determine that the new network need not be selected. In some implementations, UAV 220 may continue to communicate with UAV platform 230, via the selected network, if a new network is not selected. In some implementations, UAV 220 may continue along the flight path based on the flight path instructions until UAV 220 arrives at the destination location. When UAV 220 arrives at the destination location, UAV 220 may provide a notification to UAV platform 230, via one or more of networks 240-260. In some implementations, the notification may indicate that UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
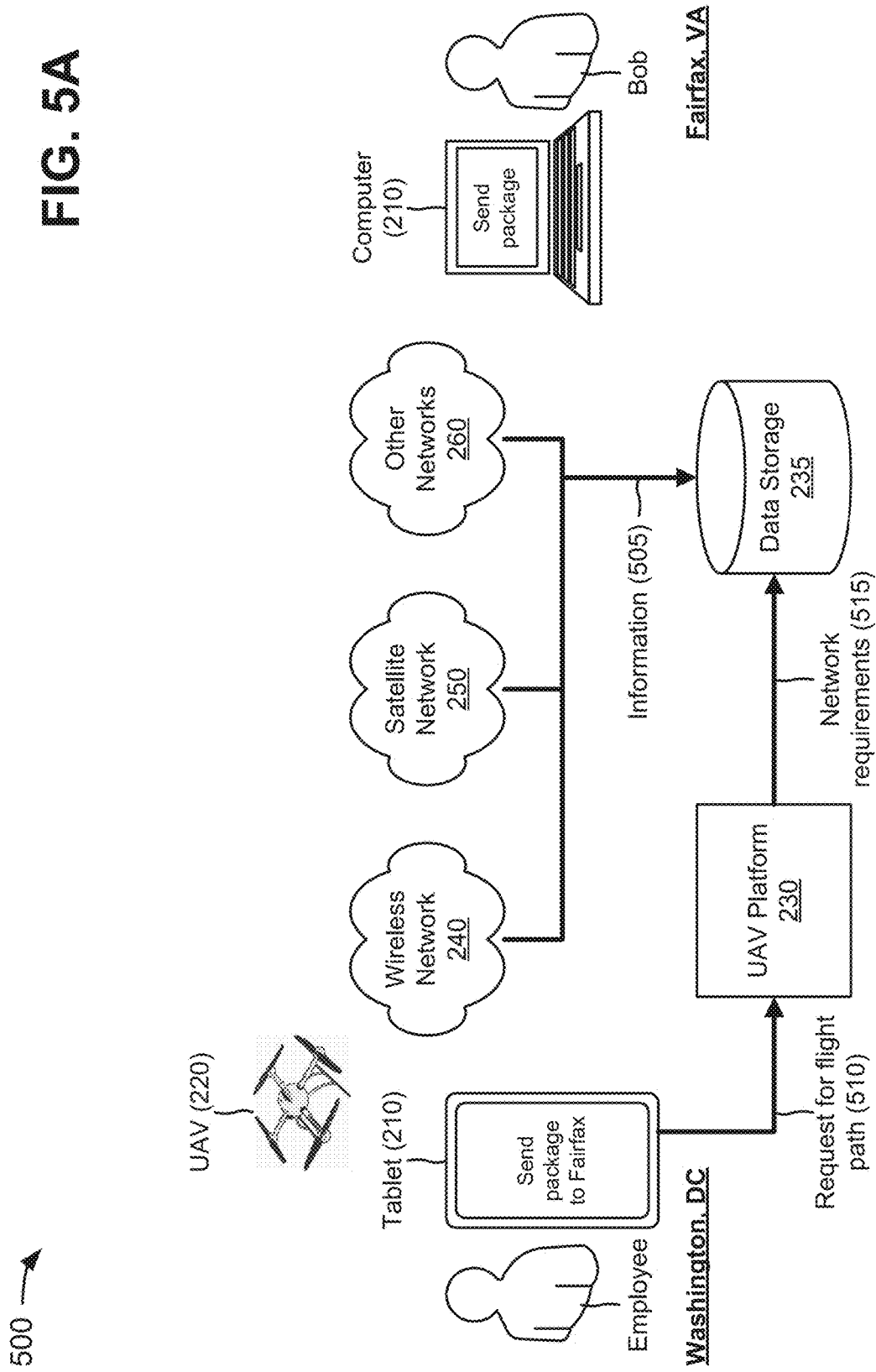
Figure 5B:
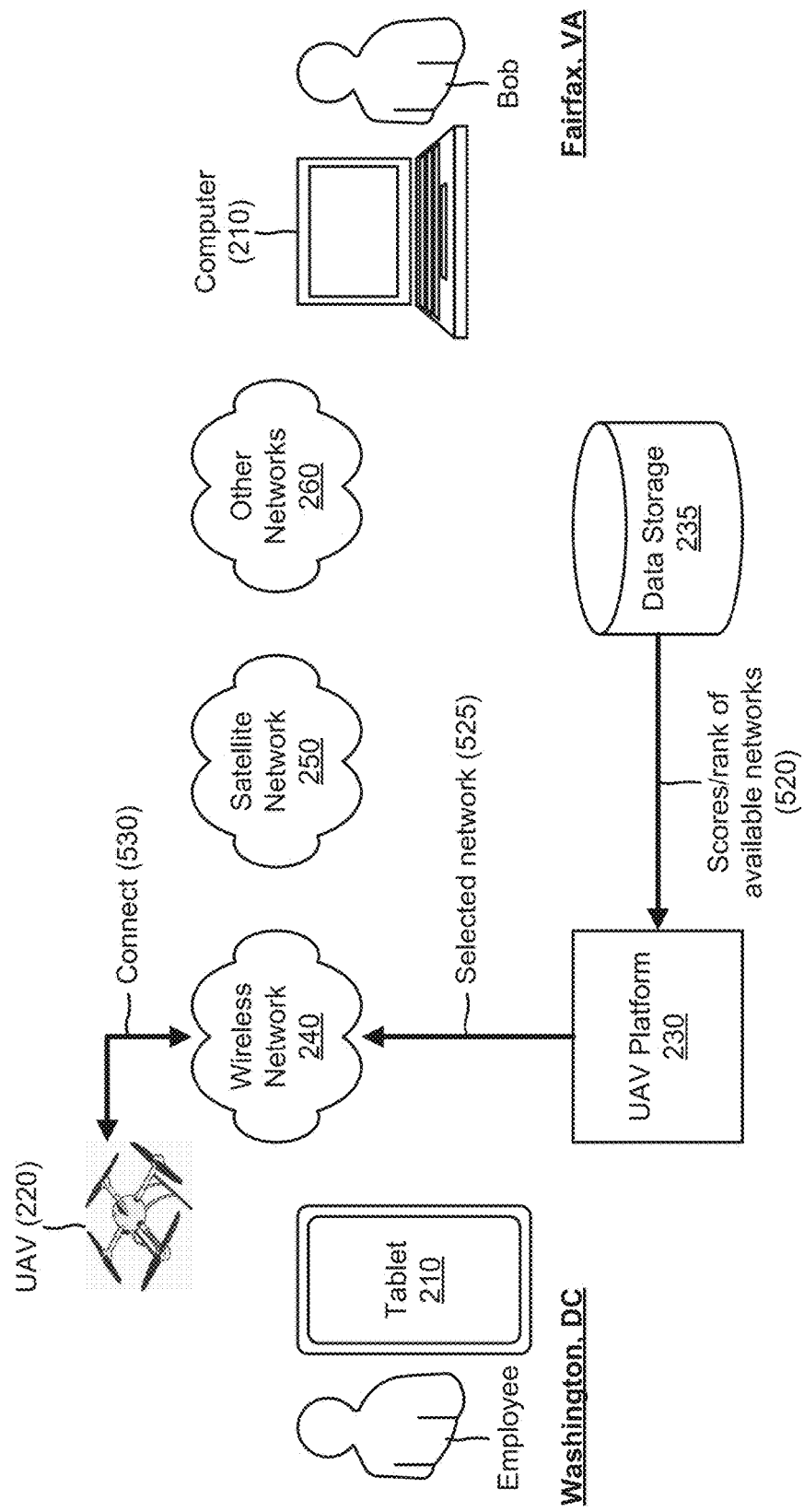

FIGS. 5A-5E are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize UAV 220 to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. One or more of networks 240-260 may provide, to data storage 235, information 505, such as capability information associated with UAV 220, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 to generate a request 510 for a flight path (e.g., from Washington, D.C. to Fairfax, Va.) for UAV 220, and to provide request 510 to UAV platform 230. Request 510 may include credentials (e.g., a serial number, an identifier of a UICC, etc.) associated with UAV 220, or the credentials may be provided separately from request 510 to UAV platform 230. UAV platform 230 may utilize the credentials to determine whether UAV 220 is authenticated for utilizing UAV platform 230 and/or one or more of networks 240-260, and is registered with an appropriate authority for use. For example, UAV platform 230 may compare the credentials with information provided in data storage 235 in order to determine whether UAV 220 is authenticated for utilizing UAV platform 230 and/or one or more of networks 240-260, and is registered with an appropriate authority. Assume that UAV 220 is authenticated and/or registered.

UAV platform 230 may calculate a flight path from Washington, D.C. to Fairfax, Va. based on information 505 (e.g., weather information, air traffic information, obstacle information, regulatory information, historical information, etc.) provided in data storage 235. For example, assume that the weather information indicates that the wind is ten kilometers per hour from the west and that it is raining; the air traffic information indicates that a jet is at an altitude of ten-thousand meters and another UAV 220 is at an altitude of five-hundred meters; the obstacle information indicates that a mountain is two kilometers in height and a building is five-hundred meters in height; the regulatory information indicates that there is a no-fly zone over a government building; and the historical information indicates that a historical flight path had a duration of thirty minutes and an altitude of one-thousand meters. UAV platform 230 may calculate the flight path from Washington, D.C. to Fairfax, Va. based on such information.

As further shown in FIG. 5A, UAV platform 230 may determine network requirements 515 for the requested flight path based on request 510. For example, UAV platform 230 may determine that network requirements 515 include UAV 220 utilizing one or more of networks 240-260 to communicate with UAV platform 230 during the flight path. UAV platform 230 may provide network requirements 515 to data storage 235 (e.g., for storage).

UAV platform 230 may assign different weights to different information associated with available networks (e.g., networks 240-260), and may calculate a score for each network based on the assigned weights and/or based on network requirements 515. UAV platform 230 may rank the networks based on the scores, and may provide the ranking and the scores of the networks to data storage 235 (e.g., for storage). Assume that UAV platform 230 ranks wireless network 240 the highest based on the calculated scores. UAV platform 230 may retrieve the ranking and the scores of the networks from data storage 235, as indicated by reference number 520 in FIG. 5B. UAV platform 230 may select a particular network (e.g., wireless network 240), from the networks, based on the ranking and/or based on network requirements 515, as indicated by reference number 525. As further shown in FIG. 5B, UAV 220 may connect 530 with wireless network 240 based on the selection of wireless network 240 as the particular network. Once connected to wireless network 240, UAV 220 may communicate with UAV platform 230 via wireless network 240.

The calculated flight path from Washington, D.C. to Fairfax, Va. may be depicted by reference number 535 in FIG. 5C. As further shown in FIG. 5C, UAV platform 230 may generate flight path instructions 540 for flight path 535. Flight path instructions 540 may include, for example, information instructing UAV 220 to fly north at zero degrees for ten kilometers, then northeast at forty degrees for three kilometers, at an altitude of one-thousand meters, etc. UAV platform 230 may provide flight path instructions 540 to UAV 220 via wireless network 240. The package may be attached to or provided in UAV 220 (e.g., by the employee). UAV 220 may take off from Washington, D.C. with the package, and may travel flight path 535 based on flight path instructions 540.

While UAV 220 is traveling along flight path 535, UAV 220 and/or wireless network 240 may provide network connectivity information 545 to UAV platform 230, as shown in FIG. 5D. Assume that UAV 220 is flying out of range of wireless network 240, and provides, to UAV platform 230, information indicating that UAV 220 is losing connectivity with wireless network 240 (e.g., via network connectivity information 545). Based on network connectivity information 545, UAV platform 230 may select a new network 550 that enables UAV 220 to communicate with UAV platform 230. Assume that UAV platform 230 selects satellite network 250 as new network 550, and instructs wireless network 250 to handover 555 communications with UAV 220 to satellite network 250. As further shown in FIG. 5D, UAV 220 may connect 560 with satellite network 250, based on the selection of satellite network 250, and may communicate with UAV platform 230 via satellite network 250. While communications are being switched from wireless network 240 to satellite network 250, UAV 220 may continue to travel along flight path 535 until UAV 220 arrives at Fairfax, Va.

As further shown in FIG. 5D, when UAV 220 arrives at Fairfax, Va., UAV 220 may leave the package at a location where Bob may retrieve the package. UAV 220 and/or computer 210 (e.g., via Bob's input or detection of the presence of UAV 220) may generate a notification 565 indicating that UAV 220 and the package arrived safely at a particular location in Fairfax, Va., and may provide notification 565 to UAV platform 230.

Figure 5E:
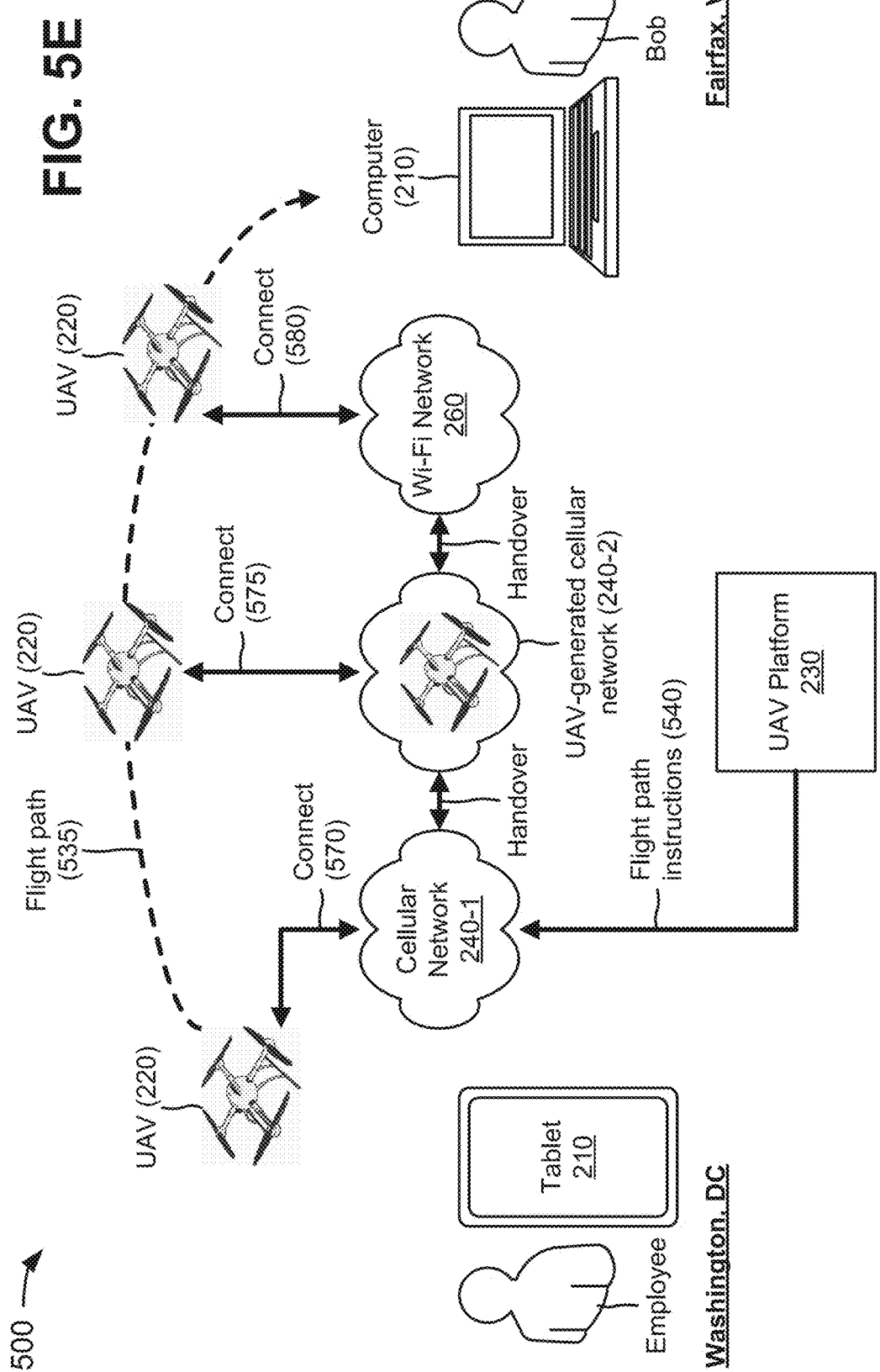

As shown in FIG. 5E, now assume that UAV 220 receives flight path instructions 540, for flight path 535, from UAV platform 230. Further, assume that flight path instructions 540 instruct UAV 220 to connect to a cellular network 240-1, and that UAV 220 connects 570 with cellular network 240-1 based on flight path instructions 540. UAV 220 may take off from Washington, D.C. with the package, and may travel flight path 535 based on flight path instructions 540. UAV 220 may communicate with UAV platform 230, via cellular network 240-1, for a portion of flight path 535. As further shown in FIG. 5E, UAV 220 may disconnect from cellular network 240-1 at a particular point of flight path 535, and may connect 575 with a UAV-generated cellular network 240-2. UAV 220 may communicate with UAV platform 230, via UAV-generated cellular network 240-2, for another portion of flight path 535. As further shown in FIG. 5E, UAV 220 may disconnect from UAV-generated cellular network 240-2 at another particular point of flight path 535, and may connect 580 with a Wi-Fi network 260. UAV 220 may communicate with UAV platform 230, via Wi-Fi network 260, for a final portion of flight path 535.

As indicated above, FIGS. 5A-5E are provided merely as an example. Other examples are possible and may differ from what was described with regard to FIGS. 5A-5E.

Systems and/or methods described herein may provide a platform that enables UAVs to safely traverse flight paths from origination locations to destination locations. The systems and/or methods may enable UAVs to seamlessly connect with the platform via various networks, which may ensure that the platform continuously communicates with the UAVs. The systems and/or methods may enable the platform to select a network for communicating with the UAV, and the selected network may reduce connectivity costs, increase security of communications, reduce the need for handoffs to other networks, offer the best connectivity, or the like.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a request for a flight path, for an unmanned aerial vehicle, from a first geographical location to a second geographical location;
   determining, by the device, aviation information,
      the aviation information indicating whether the unmanned aerial vehicle can complete the flight path without stopping;
   determining, by the device, a waypoint based on the aviation information indicating that the unmanned aerial vehicle cannot complete the flight path without stopping,
      the waypoint being a location along the flight path for recharging or refueling;
   calculating, by the device, the flight path based on the request for the flight path and based on the aviation information;
   determining, by the device, network requirements for the flight path based on the request for the flight path;
   determining, by the device, scores for a plurality of networks with coverage areas covering at least a portion of the flight path,
      the scores for the plurality of networks being based on information associated with the plurality of networks including at least one of:
         availability information,
         security information,
         cost information, or
         bandwidth information;
   selecting, by the device, a first particular network, of the plurality of networks, based on the network requirements for the flight path and based on the scores for the plurality of networks;
   causing, by the device, a connection with the unmanned aerial vehicle and the first particular network to be established;
   generating, by the device, flight path instructions for the flight path,
      the flight path instructions including information associated with the waypoint, and
      the flight path instructions instructing the unmanned aerial vehicle to:
         maintain the connection with the first particular network until the unmanned aerial vehicle reaches a particular location, and
         connect to a second particular network when the unmanned aerial vehicle reaches the particular location;
   providing, by the device and via the connection with the first particular network, the flight path instructions to the unmanned aerial vehicle causing the unmanned aerial vehicle to travel from the first geographical location toward the second geographical location via the flight path based on the flight path instructions;
   receiving, by the device, network connectivity information,
      the network connectivity information including information associated with a strength of a signal between the unmanned aerial vehicle and the first particular network or the second particular network;
   selecting, by the device, a third particular network, of the plurality of networks, based on the network connectivity information; and
   causing, by the device, a connection between the unmanned aerial vehicle and the third particular network to be established.

2. The method of claim 1, where determining the network requirements for the flight path comprises at least one of:
   determining the network requirements for the flight path based on the first geographical location and the second geographical location;
   determining the network requirements for the flight path based on component information associated with the unmanned aerial vehicle;
   determining the network requirements for the flight path based on costs associated with the plurality of networks;
   determining the network requirements for the flight path based on security associated with the plurality of networks;
   determining the network requirements for the flight path based on bandwidths associated with the plurality of networks;
   determining the network requirements for the flight path based on availability associated with the plurality of networks; or
   determining the network requirements, for the flight path, that maximize connectivity with the plurality of networks.

3. The method of claim 1, further comprising:
   assigning weights to the information associated with the plurality of networks; and
   where determining the scores for the plurality of networks comprises:
      determining the scores for the plurality of networks based on the assigned weights.

4. The method of claim 1, further comprising:
   determining a ranking of the plurality of networks based on the scores; and
   where selecting the first particular network comprises:
      selecting the first particular network, from the plurality of networks, based on the ranking of the plurality of networks.

5. The method of claim 1, where receiving the network connectivity information comprises:
   receiving, from the unmanned aerial vehicle, the network connectivity information during traversal of the flight path by the unmanned aerial vehicle; and
   where the method further comprises:
      determining whether to select another particular network, from the plurality of networks, based on the network connectivity information.

6. The method of claim 1, where selecting the third particular network comprises:
   selecting the third particular network based on the network connectivity information indicating that the signal will be lost.

7. The method of claim 1, further comprising:
   maintaining the connection with the first particular network based on the network connectivity information indicating that communication between the first particular network and the unmanned aerial vehicle will continue.

8. A device, comprising:
   one or more processors to:

receive a request for a flight path, for an unmanned aerial vehicle, from a first geographical location to a second geographical location;
determine aviation information,
the aviation information indicating whether the unmanned aerial vehicle can complete the flight path without stopping;
determine a waypoint based on the aviation information indicating that the unmanned aerial vehicle cannot complete the flight path without stopping,
the waypoint being a location along the flight path for recharging or refueling;
calculate the flight path based on the request for the flight path and based on the aviation information;
determine network requirements for the flight path based on the request for the flight path;
determine scores for a plurality of networks with coverage areas covering at least a portion of the flight path,
the scores for the plurality of networks being based on information associated with the plurality of networks including at least one of:
availability information,
security information,
cost information, or
bandwidth information;
select a first particular network, of the plurality of networks, based on the network requirements for the flight path and based on the scores for the plurality of networks;
cause a connection with the unmanned aerial vehicle and the first particular network to be established;
generate flight path instructions for the flight path,
the flight path instructions including information associated with the waypoint, and
the flight path instructions instructing the unmanned aerial vehicle to:
maintain the connection with the first particular network until the unmanned aerial vehicle reaches a particular location; and
connect to a second particular network when the unmanned aerial vehicle reaches the particular location;
provide, via the connection with the first particular network, the flight path instructions to the unmanned aerial vehicle causing the unmanned aerial vehicle to travel from the first geographical location toward the second geographical location via the flight path based on the flight path instructions;
receive network connectivity information,
the network connectivity information including information associated with a strength of a signal between the unmanned aerial vehicle and the first particular network or the second particular network;
select the first particular network, the second particular network, or a third particular network, of the plurality of networks, based on the network connectivity information and the flight path instructions; and
cause a connection between the unmanned aerial vehicle and the first particular network, the second particular network, or the third particular network to be established.

9. The device of claim 8, where, when determining the network requirements for the flight path, the one or more processors are to:

determine the network requirements for the flight path based on at least one of:
the first geographical location and the second geographical location;
component information associated with the unmanned aerial vehicle;
costs associated with the plurality of networks;
security associated with the plurality of networks;
bandwidths associated with the plurality of networks;
availability associated with the plurality of networks; or
maximizing connectivity with the plurality of networks.

10. The device of claim 8, where the one or more processors are further to:
assign weights to the information associated with the plurality of networks; and
where, when determining the scores for the plurality of networks, the one or more processors are to:
determine the scores for the plurality of networks based on the assigned weights.

11. The device of claim 8, where the one or more processors are further to:
determine a ranking of the plurality of networks based on the scores; and
where, when selecting the first particular network based on the network requirements for the flight path and based on the scores for the plurality of networks, the one or more processors are to:
select the first particular network, from the plurality of networks, based on the ranking of the plurality of networks.

12. The device of claim 8, where, when receiving the network connectivity information, the one or more processors are to:
receive, from the unmanned aerial vehicle, the network connectivity information during traversal of the flight path by the unmanned aerial vehicle; and
where the one or more processors are further to:
determine whether to select another particular network, from the plurality of networks, based on the network connectivity information.

13. The device of claim 8, where, when selecting the first particular network, the second particular network, or the third particular network, the one or more processors are to:
select the second particular network or the third particular network based on the network connectivity information indicating that the signal is being lost.

14. The device of claim 8, where the one or more processors are further to:
maintain the connection with the first particular network based on the network connectivity information indicating that communication between the first particular network and the unmanned aerial vehicle will continue.

15. A non-transitory computer-readable medium for storing instructions, the instructions comprising:
one or more instructions that, when executed by one or more processors of a device, cause the one or more processors to:
receive a request for a flight path, for an unmanned aerial vehicle, from a first geographical location to a second geographical location;
determine aviation information,
the aviation information indicating whether the unmanned aerial vehicle can complete the flight path without stopping;

determine a waypoint based on the aviation information indicating that the unmanned aerial vehicle cannot complete the flight path without stopping,
the waypoint being a location along the flight path for recharging or refueling;
calculate the flight path based on the request for the flight path and based on the aviation information;
determine network requirements for the flight path based on the request for the flight path;
determine scores for a plurality of networks with coverage areas covering at least a portion of the flight path,
the scores for the plurality of networks being based on information associated with the plurality of networks;
select a first particular network, of the plurality of networks, based on the network requirements for the flight path and based on the scores for the plurality of networks;
cause a connection with the unmanned aerial vehicle and the first particular network to be established;
generate flight path instructions for the flight path,
the flight path instructions including information associated with the waypoint, and
the flight path instructions instructing the unmanned aerial vehicle to:
maintain the connection with the first particular network until the unmanned aerial vehicle reaches a particular location, and
connect to a second particular network when the unmanned aerial vehicle reaches the particular location;
provide, via the connection with the first particular network, the flight path instructions to the unmanned aerial vehicle causing the unmanned aerial vehicle to travel from the first geographical location toward the second geographical location via the flight path;
receive network connectivity information,
the network connectivity information including information associated with a strength of a signal between the unmanned aerial vehicle and the first particular network or the second particular network;
select the first particular network, the second particular network, or a third particular network, of the plurality of networks, based on the network connectivity information; and
cause a connection between the unmanned aerial vehicle and the first particular network, the second particular network, or the third particular network to be established.

16. The non-transitory computer-readable medium of claim 15, where the one or more instructions, that cause the one or more processors to determine the network requirements for the flight path, cause the one or more processors to at least one of:
determine the network requirements for the flight path based on the first geographical location and the second geographical location;
determine the network requirements for the flight path based on component information associated with the unmanned aerial vehicle;
determine the network requirements for the flight path based on costs associated with the plurality of networks;
determine the network requirements for the flight path based on security associated with the plurality of networks;
determine the network requirements for the flight path based on bandwidths associated with the plurality of networks;
determine the network requirements for the flight path based on availability associated with the plurality of networks; or
determine the network requirements, for the flight path, that maximize connectivity with the plurality of networks.

17. The non-transitory computer-readable medium of claim 15, where the one or more instructions, when executed by the one or more processors, further cause the one or more processors to:
assign weights to the information associated with the plurality of networks; and
where the one or more instructions, that cause the one or more processors to determine the scores for the plurality of networks, cause the one or more processors to:
determine the scores for the plurality of networks based on the assigned weights.

18. The non-transitory computer-readable medium of claim 15, where the
one or more instructions, when executed by the one or more processors, that cause the one or more processors to:
determine a ranking of the plurality of networks based on the scores; and
where the one or more instructions, that cause the one or more processors to select the first particular network based on the network requirements for the flight path and based on the scores for the plurality of networks, cause the one or more processors to:
select the first particular network, from the plurality of networks, based on the ranking of the plurality of networks.

19. The non-transitory computer-readable medium of claim 15, where the one or more instructions, that cause the one or more processors to receive the network connectivity information, cause the one or more processors to:
receive, from the unmanned aerial vehicle, the network connectivity information during traversal of the flight path by the unmanned aerial vehicle; and
where the one or more instructions, that cause the one or more processors to select the first particular network, the second particular network, or the third particular network, cause the one or more processors to:
select the second particular network or the third particular network based on the network connectivity information indicating that the signal lost or will be lost.

20. The non-transitory computer-readable medium of claim 15, where the connection is a first connection; and
where the one or more instructions, when executed by the one or more processors, further cause the one or more processors to:
cause the first connection to be established until the unmanned aerial vehicle reaches the particular location;
cause a second connection with the unmanned aerial vehicle and the second particular network to be established when the unmanned aerial vehicle reaches the particular location; and cause the first connection to be terminated after the second connection is established.

* * * * *